United States Patent [19]

Nagano et al.

[11] Patent Number: 5,148,791
[45] Date of Patent: Sep. 22, 1992

[54] METHOD OF ELECTRONIC ENGINE CONTROL FOR INTERNAL COMBUSTION ENGINE HAVING A PLURALITY OF CYLINDERS

[75] Inventors: Masami Nagano; Masahide Sakamoto, both of Katsuta, Japan

[73] Assignee: Hitachi, Ltd., Tokyo, Japan

[21] Appl. No.: 762,331

[22] Filed: Sep. 19, 1991

[30] Foreign Application Priority Data

Sep. 19, 1990 [JP] Japan ................... 2-247573

[51] Int. Cl.$^5$ .................... F02P 5/15; F02D 41/14
[52] U.S. Cl. ........................ 123/417; 123/687
[58] Field of Search ............ 123/415, 416, 417, 418, 123/478, 480, 489, 492, 493; 364/431.05

[56] References Cited

U.S. PATENT DOCUMENTS

| | | | |
|---|---|---|---|
| 4,478,185 | 10/1984 | Obayashi et al. | 123/417 X |
| 4,602,603 | 7/1986 | Honkanen et al. | 123/417 X |
| 4,715,344 | 12/1987 | Tomisawa | 123/417 X |
| 4,725,955 | 2/1988 | Kobayashi et al. | 123/417 X |
| 4,785,783 | 11/1988 | Oshiage et al. | 123/417 |
| 4,879,656 | 11/1989 | Quigley et al. | 123/417 X |
| 4,942,860 | 7/1990 | Chujo et al. | 123/417 X |
| 4,986,245 | 1/1991 | Nakaniwa et al. | 123/417 X |

FOREIGN PATENT DOCUMENTS 156952 8/1985 Japan .

*Primary Examiner*—Willis R. Wolfe
*Attorney, Agent, or Firm*—Antonelli, Terry, Stout & Kraus

[57] ABSTRACT

A method of an electronic engine control for an internal combustion engine having a plurality of cylinders, wherein the very same air fuel ratio feed back coefficient obtained at a predetermined sequential timing which has been used for calculating the amount of fuel to be injected to a specific cylinder is also used for correcting timing of ignition for the same cylinder which follows immediately after the calculated amount of fuel has been injected into the specific cylinder, thereby the engine torque fluctuation is effectively suppressed, stability of engine operation during idling operation is improved and the surge during a low speed running is prevented.

6 Claims, 13 Drawing Sheets $N_e$ = CONSTANT
$P_b$ = CONSTANT

SIGNAL WAVEFORM

METHOD OF ELECTRONIC ENGINE CONTROL FOR INTERNAL COMBUSTION ENGINE HAVING A PLURALITY OF CYLINDERS

BACKGROUND OF THE INVENTION

The present invention relates to a method of an electronic engine control for an internal combustion engine having a plurality of cylinders, in particular relates to an electronic ignition timing control of an internal combustion engine in association with an electronic fuel injection control suitable for an automobile gasoline engine having a plurality of cylinders.

Automobile engines, in particular automobile gasoline engines are required to overcome sever exhaust gas regulations as well as to achieve a further higher performance, for this reasons such engine control devices are currently used wherein several kinds of data are taken in representing the engine operating conditions such as intake air flow and rotating speed of the engine, predetermined control data for the respective cylinders are calculated based upon these data and the amount of fuel to be fed and the ignition timing therefore are separately controlled for every cylinder in response to these control data.

In such engine control devices the several kinds of data representing the engine operating conditions are taken in and renewed one after another along with the passage of time and the amount of fuel to be injected and the ignition timing for the respective cylinders are calculated one after another based upon the newest data renewed in such a manner.

JP-A-60-156952 (1985) discloses an air fuel ratio control device for reducing engine torque fluctuation to improve engine operating property wherein the ignition timing is retarded or advanced in response to rich or lean state of the air fuel ratio with respect to a target air fuel ratio determining an optimum ignition timing. In this device the correction of the ignition timing is also carried out based upon the newest air fuel ratio feed back coefficient renewed one after another along with the passage of time.

In the conventional air fuel ratio control device, the newest air fuel ratio feed back coefficient is always used for correcting an ignition time for every cylinder and no particular consideration is not made in connection with which air fuel ratio feed back coefficients are to be used for correcting an ignition timing for a specific cylinder, such that an insufficient suppression of engine torque fluctuation is considered to be achieved.

In consideration of the above problems in the conventional art, an object of the present invention is to provided a method of an electronic engine control for an internal combustion engine having a plurality of cylinders which effectively suppresses the engine torque fluctuation during the air fuel ratio feed back control.

According to the present invention, an air fuel ratio feed back coefficient obtained at a predetermined sequential timing which is used for calculating amount of fuel to be injected to a specific cylinder is also used for correcting timing of ignition for the same cylinder which follows immediately after the calculated amount of fuel has been injected into the specific cylinder.

In the method of an electronic engine control for an internal combustion engine having a plurality of cylinders according to the present invention, with the very same air fuel ratio feed back coefficient which has been used for calculating the fuel injection amount to a specific cylinder, the ignition timing for the same cylinder which follows immediately after the fuel injection of the calculated amount of fuel into the specific cylinder is corrected. As a result, use of different air fuel ratio feed back coefficients for the determination of amount of fuel to be injected to the specific cylinder and of the ignition timing for the injected fuel for the same cylinder due to difference between the fuel injection timing and the ignition timing is eliminated, thereby an optimum ignition timing correction is performed which meets the air fuel ratio of the specific cylinder.

Since, as explained above, the very same air fuel ratio feed back coefficient obtained at a predetermined sequential timing which has been used for calculating the amount of fuel to be injected to the specific cylinder is also used for correcting the timing of ignition for the same cylinder which follows immediately after the calculated amount of fuel has been injected into the specific cylinder, the engine torque fluctuation is effectively suppressed, stability during idling operation is improved occurrence of the surge during a low speed running is prevented.

DESCRIPTION OF THE PREFERRED EMBODIMENTS

Hereinbelow preferred embodiments of the method of an electronic engine control for an internal combustion engine having a plurality of cylinders according to the present invention are explained with reference to the drawings.

Figure 1:
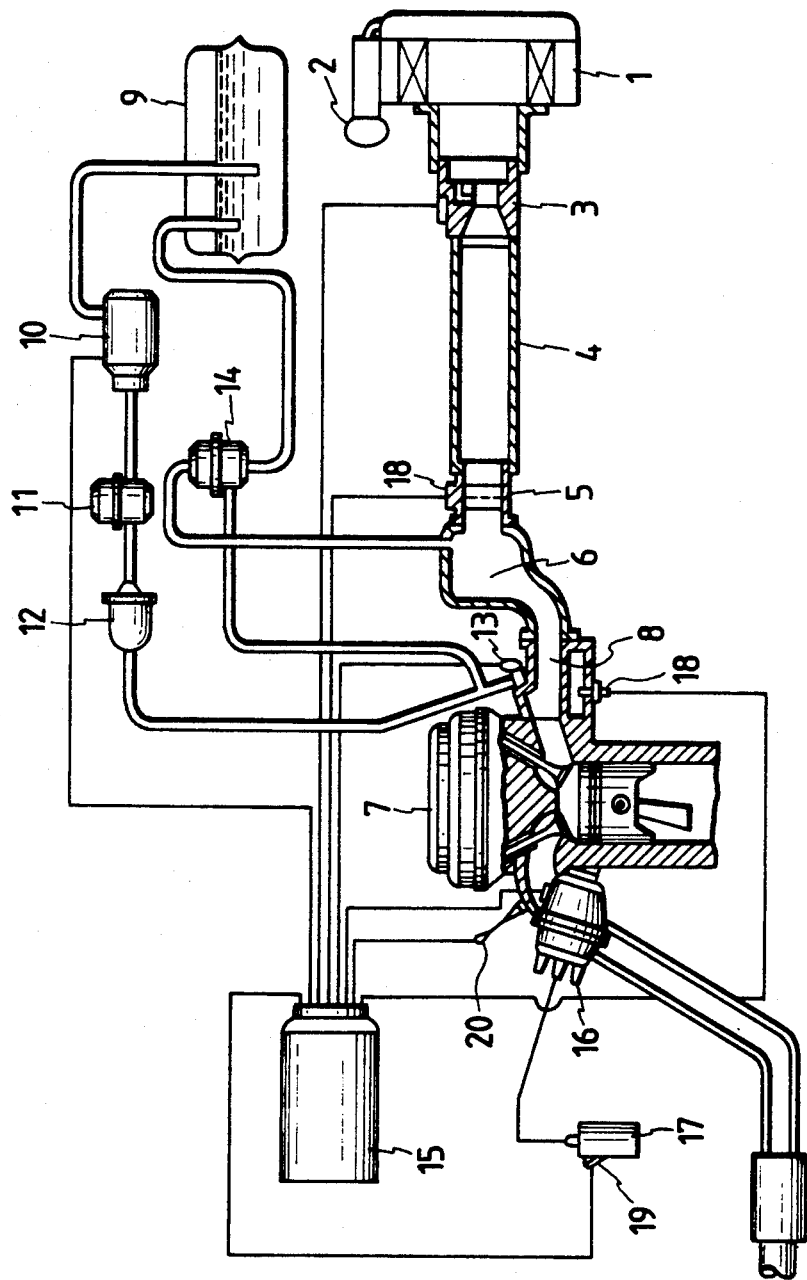
FIG. 1 is a schematic diagram showing one example of internal combustion engine control systems to which embodiments of the present invention are applied.

FIG. 1 shows an example of internal combustion engine control systems to which the present invention is applied. In the drawing, air to be fed to an engine 7 is taken in from an inlet port 2 of an air cleaner 1 and flows into a collector 6 via a hot wire air flow meter 3 which detects the intake air flow rate, a duct 4 and a throttle valve body 5 incorporating a throttle valve which controls the intake air flow rate. In the collector 6 the intake air is divided to respective intake pipes 8 connected to respective cylinders in the engine 7 and introduced to the respective cylinders.

On the other hand, fuel such as gasoline, after pumped up from a fuel tank 9 and pressurized via a fuel pump 10, is supplied to a fuel piping line including a fuel damper 11, a fuel filter 12, fuel injectors 13 and a fuel pressure regulator 14. The pressure of the fuel is regulated at a predetermined pressure by the above fuel pressure regulator 14 and the pressure regulated fuel is injected into the respective intake pipes 8 from the fuel injectors 13 which are disposed in the respective intake pipes 8 of the respective cylinders.

The output signals from the air flow meter 3 representing the intake air flow rate are input to a control unit 15.

A throttle sensor 18 which detects the opening degree of the throttle valve is disposed on the throttle valve body 5 and the output of the throttle sensor 18 is also input to the control unit 15.

In a distributor 16, a crank angle sensor is built in, from the crank angle sensor reference angle signals REF representing a rotating position of the crank shaft and angle signals POS used for detecting rotating number are output, and these signals are also input to the control unit 15.

In an exhaust pipe an $O_2$ sensor 20 is disposed which detects whether the air fuel ratio is in rich state or in lean state with reference to stoichiometric air fuel ratio, and the output signals of the $O_2$ sensor are input to the control unit 15.

Figure 2:
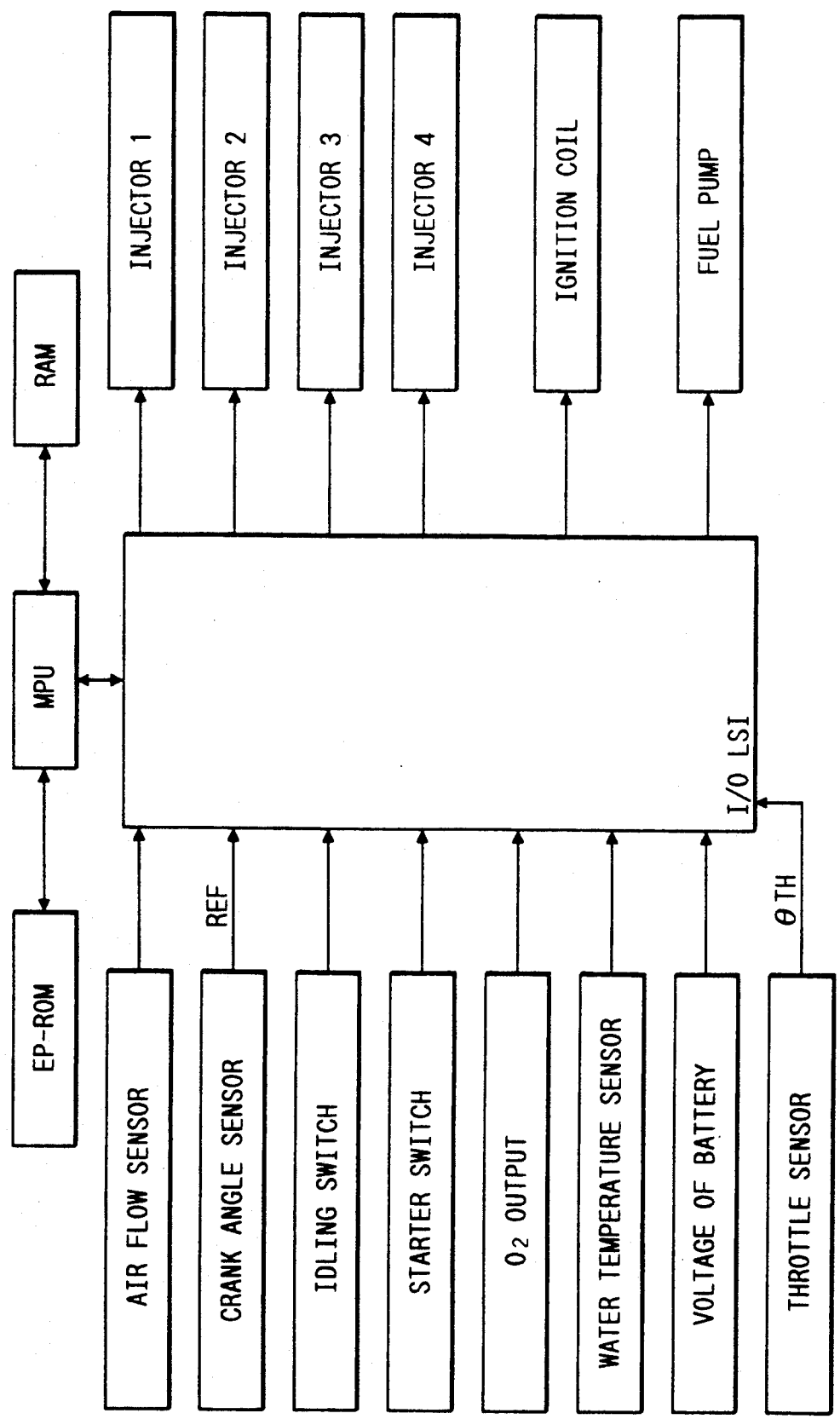
FIG. 2 is a block diagram of the control unit shown in FIG. 1.

FIG. 2 shows a block diagram of the control unit 15 of which major part is composed of an EP-ROM, a MPU, a ROM and an I/O LSI including an A/D converter. The control unit 15 takes in signals as its inputs from several kinds of sensors which detect engine operating conditions, executes a predetermined processing operation, outputs several kinds of control signals which have been determined as a result of the processing operation and applies the predetermined control signals such as to the above explained fuel injection valves 13 and an ignition coil 17 through a power transistor 19 to carry out the fuel supply control and ignition timing control.

The detail of these controls via the control unit 15 according to one embodiment of the present invention is explained hereinafter with reference to the functional block diagram shown in FIG. 3.

Figure 4:
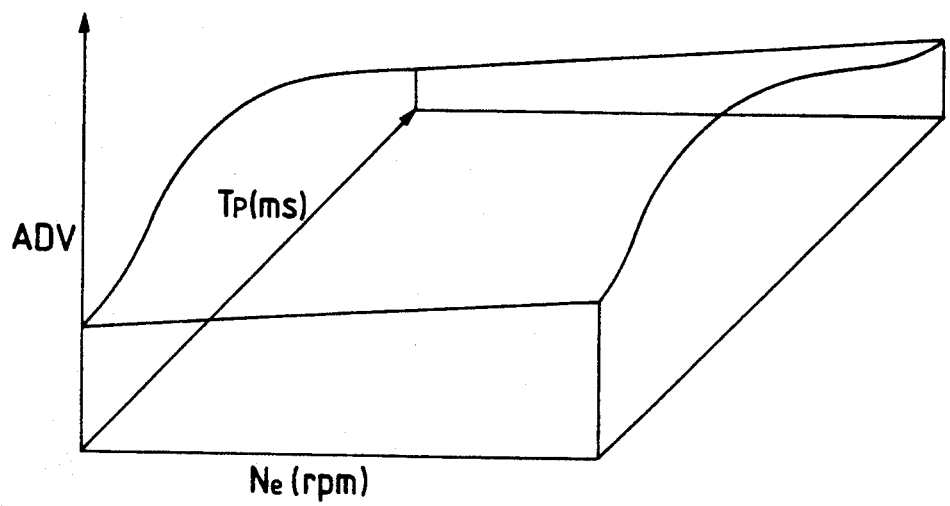
FIG. 4 is a view for explaining a map represented in an analogue form used in the one embodiment of the present invention.
Figure 5:
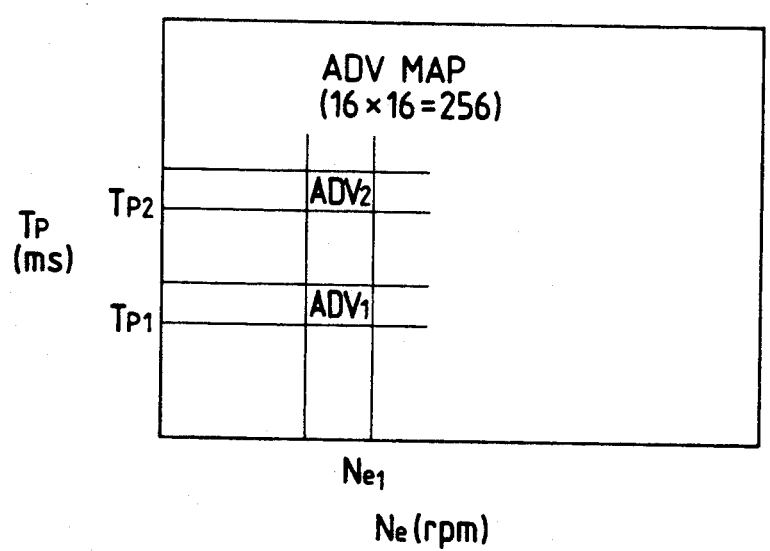
FIG. 5 is a view for explaining a map represented in a digital form used in the one embodiment of the present invention.

Calculating step of the ignition timing is at first explained, the ignition timing is obtained by retrieving a map which consists of engine rotating number $N_e$ as abscissa and base pulse width $T_p$ which constitutes a base value of fuel injection amount. The examples of these maps are shown in FIG. 4 and FIG. 5. FIG. 4 shows the map in an analogue form and FIG. 5 in a digital form and the both are substantially the same. Since the base pulse width $T_p$ constituting ordinate is used as a datum representing the engine load, such as engine intake vacuum $P_c$ and data LDATA which directly represents engine load can be used for a map retrieval in place of the base pulse width.

Figure 6:
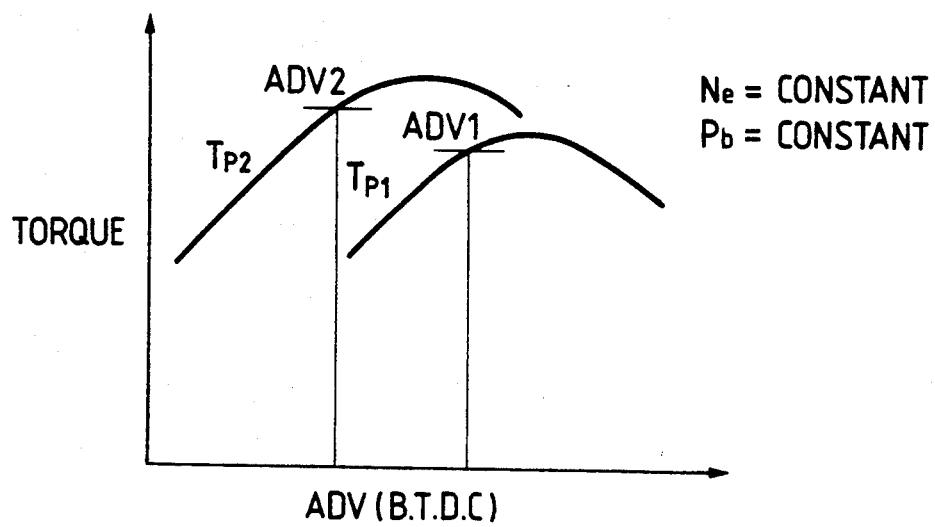
FIG. 6 is a graphical view showing characteristic curves representing a relationship between ignition timing for an engine cylinder and engine torque generated thereby.

In FIG. 5, the abscissa and ordinates in the map are respectively divided into 16 areas such that the map contains 256 data in total. In the respective regions ignition timings near the minimum best torque (MBT) are stored one by one which are obtained by measuring the relationship between ignition timing ADV and generated torque while maintaining the engine operating condition constant as shown in FIG. 6. These stored ignition timings constitute base ignition timings.

Now, an air fuel ratio feed back control system is explained. The system is adapted to always maintain the air fuel ratio near the stoichiometric air fuel ratio in order for most effectively making use of a ternary system catalyst.

Figure 7:
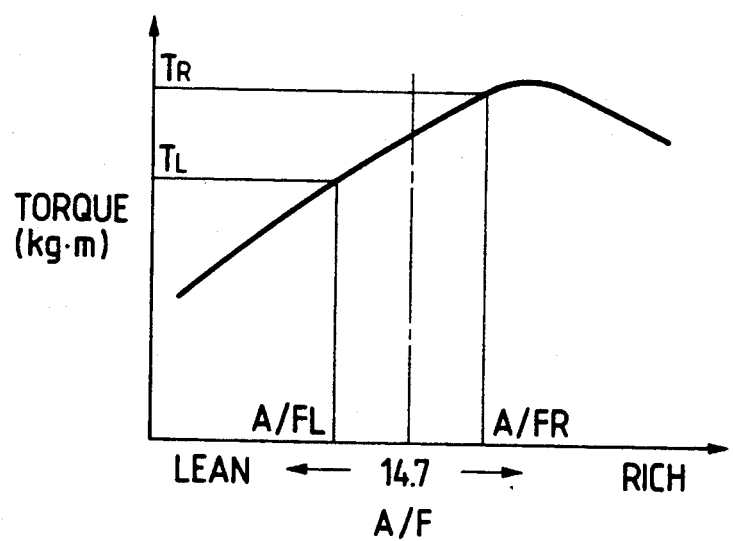
FIG. 7 is a graphical view showing a relationship between air fuel ratio in an engine cylinder and engine torque generated therewith.

In the control system, a PI (proportional and integration) control is applied so that the air fuel ratio alternates between rich and lean states with respect to the stoichiometric air fuel ratio. Therefore in dependence upon the air fuel ratio alternation between lean air fuel ratio A/FL and rich air fuel ratio A/FR the torque generated varies from $T_L$ to $T_R$ as shown in FIG. 7 which degrades stability of the engine operation during idling operation and causes surging.

Figure 8:
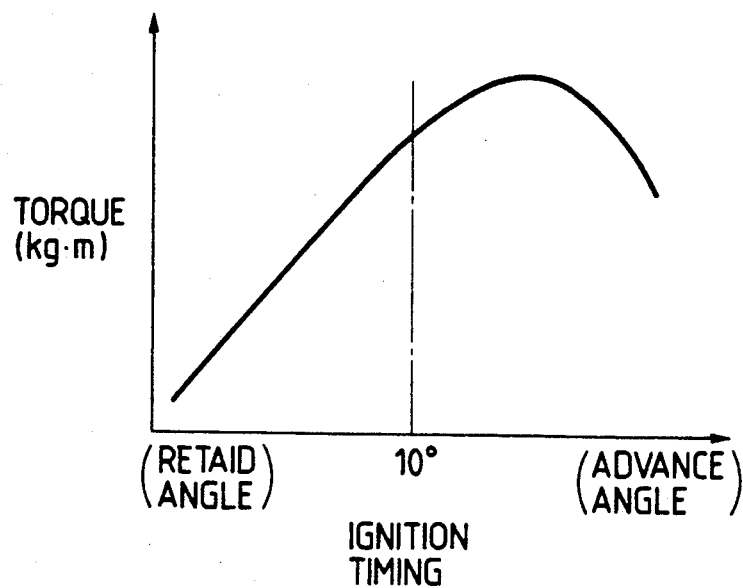
FIG. 8 is a graphical view showing a relationship between ignition timing for an engine cylinder charged with a same air fuel ratio and engine torque generated thereby.

FIG. 8 shows an engine torque characteristic with respect to ignition timing, as will be seen from the drawing, through control of the ignition timing the engine torque fluctuation caused by the above air fuel ratio alternation can be prevented.

Further the air fuel ratios are known to be assumed from air fuel ratio feed back coefficients.

The present invention thus is contemporated by making use of the above facts, in that the engine torque is variable in dependence upon air fuel ratio and in relation to ignition timing and the air fuel ratio is determinable from air fuel ratio feed back coefficient, of which outline is explained with reference to FIG. 9 hereinbelow.

Figure 9:
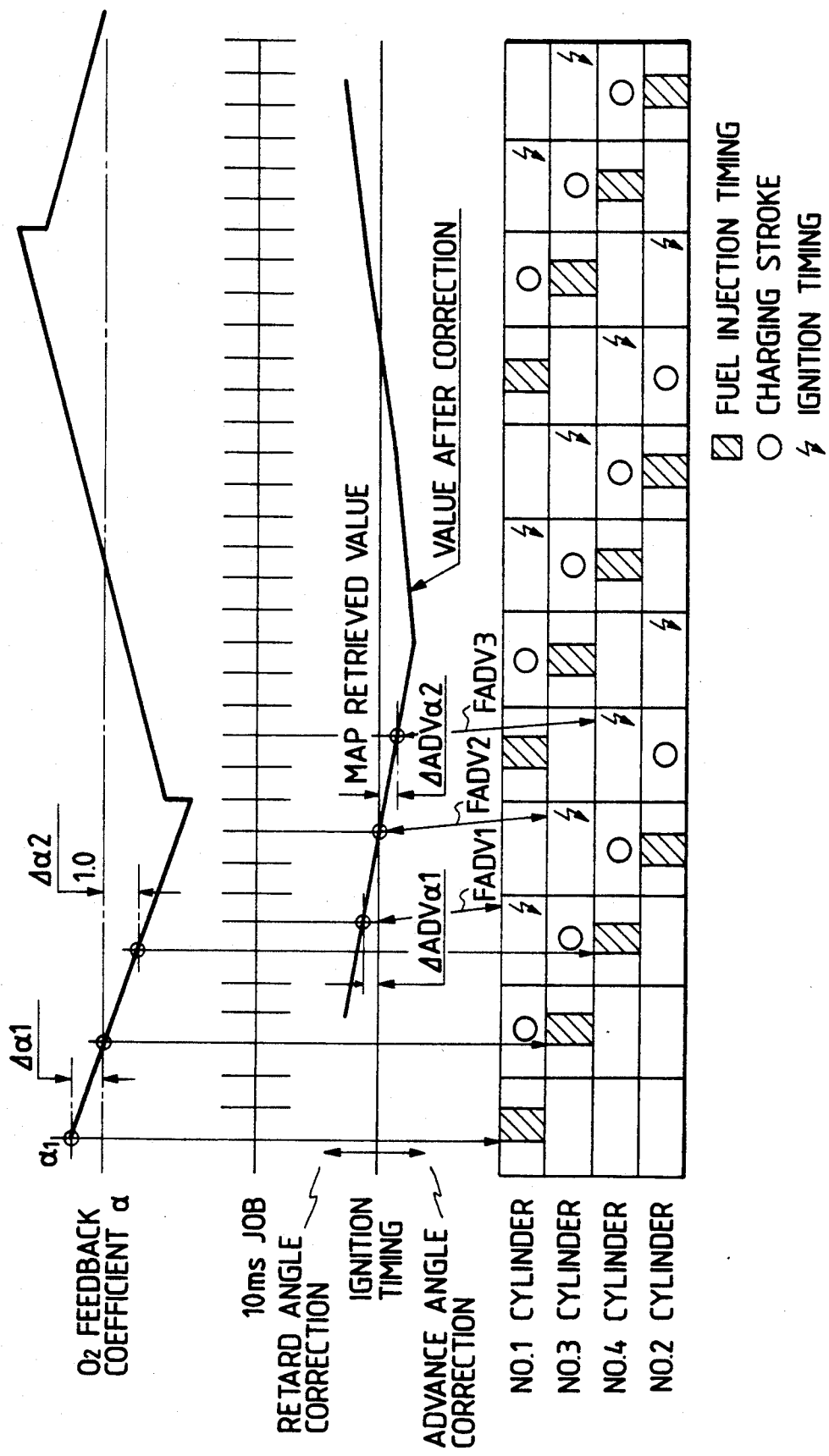
FIG. 9 is a timing chart for explaining a correcting step of ignition timings for respective cylinders according to the one embodiment of the present invention.

FIG. 9 shows a relationship between such as air fuel ratio feed back coefficient, ignition timing correction amount and fuel injection timing and ignition timing to the respective cylinders.

Now, noting No. 1 cylinder, the fuel injection amount is calculated by taking into account of air fuel ratio feed back coefficient $\alpha_1$. Therefore the air fuel ratio of the No. 1 cylinder is determined to be enriched by $\alpha_1$ accordingly the ignition timing has to be retarded to suppress the torque increase caused by the corresponding enriched air fuel ratio.

Figure 10:
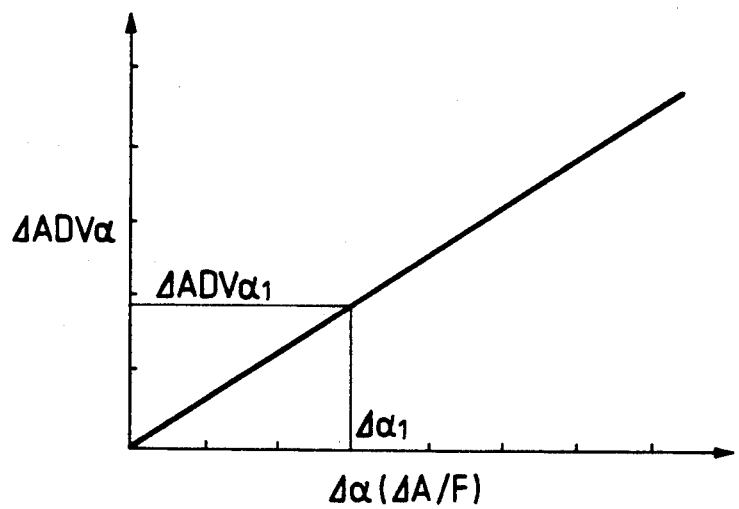
FIG. 10 and FIG. 11 are respectively characteristic diagrams showing contents in ignition timing correction tables used in the one embodiment of the present invention.

FIG. 10 shows a relationship between deviation $\Delta\alpha$ of air fuel ratio feed back coefficient from $\alpha=1.0$ or from average thereof and ignition timing correction amount $\Delta ADV\alpha$.

Since the air fuel ratio A/F in the No. 1 cylinder has enriched by $\alpha_1$, the ignition timing for the No. 1 cylinder is determined as follows, $$FADV1 = ADVM - \Delta ADV\alpha_1,$$

wherein ADVM is a value retrieved from the map shown in FIG. 4 or FIG. 5 based on the engine rotating number $N_e$ and base pulse width $T_P$. The same steps are taken for the No. 3 cylinder, No. 4 cylinder and No. 2 cylinder, thereby the engine torque fluctuation due to air fuel ratio alternation is suppressed.

Figure 11:
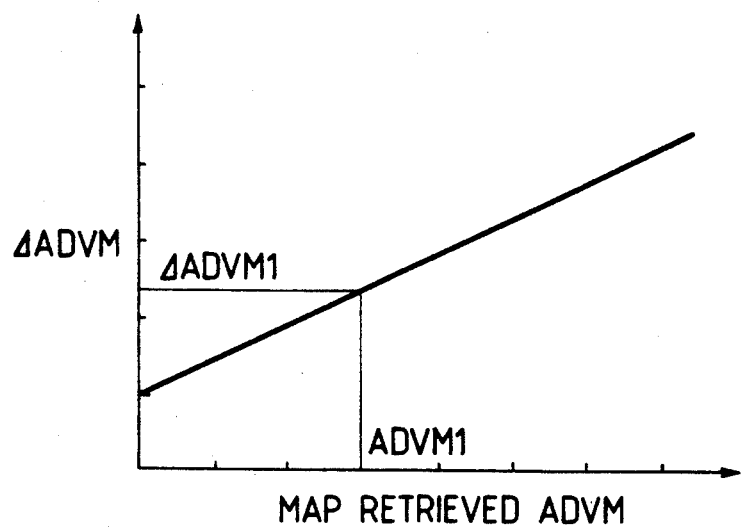

For further accurate ignition timing correction, it is desirable to further correct the map retrieved values depending upon the magnitudes thereof, because during a partial load condition the ignition timings are advanced and the generated torque curve slope with respect to ignition timing angle is generally gentle, it is preferable to increase the ignition timing correction amount at such load condition. FIG. 11 shows ignition timing correction amount $\Delta ADVM$ with respect to map retrieved value ADVM. By taking into account of the further ignition timing correction, the ignition timing FADV1 for the No. 1 cylinder is related as follows, $$FADV1 = ADVM - \Delta ADV\alpha 1 - \Delta ADVM1.$$

Figure 12:
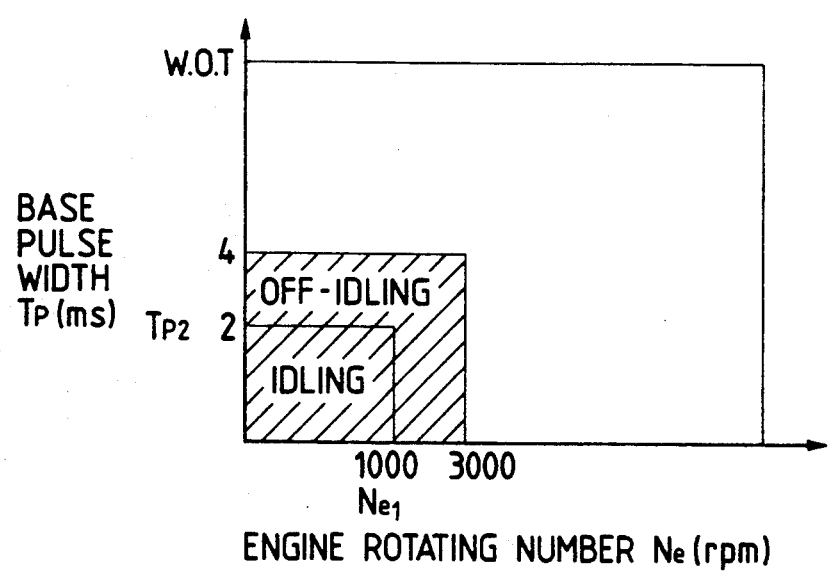
FIG. 12 is a view showing an operating range of the internal combustion engine control system to which the present invention is suitably applied.

The hatched region shown in FIG. 12 indicates an operating region of the internal combustion engine control system where the embodiment of the present invention is suitably applied.

Now, another embodiment of the present invention is explained hereinafter which is applied to the internal combustion engine control system performing an on board diagnosis of an $O_2$ sensor with respect to its deterioration and failure.

Figure 13:
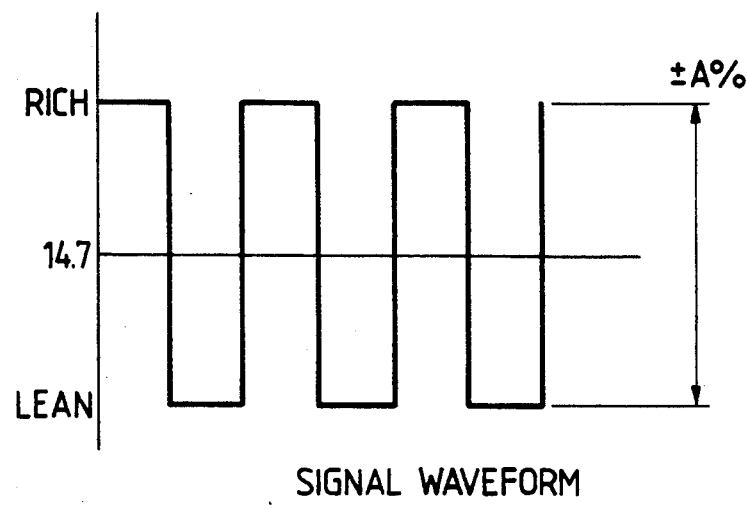
FIG. 13 is a view showing a signal wave form applied to an $O_2$ sensor in the internal combustion engine control system for on board diagnosing deterioration or failure thereof according to another embodiment of the present invention.
Figure 14:
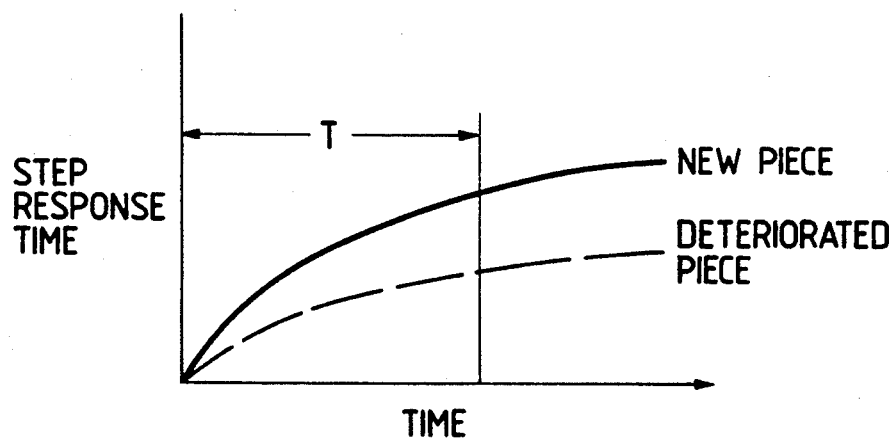
FIG. 14 is a view showing step responses of $O_2$ sensors when the signal shown in FIG. 13 is applied thereto.

For performing the on board diagnosis of the $O_2$ sensor, the $O_2$ feed back coefficient $\alpha$ is fixed when a predetermined condition has been fulfilled, and the air fuel ratio is varied between rich and lean states by making use of signals for diagnosis use as shown in FIG. 13 which are generated from an $O_2$ sensor diagnosis signal generating means to determine deterioration or failure of the $O_2$ sensor in view of obtained step response characteristics of $O_2$ sensors as shown in FIG. 14.

As will be seen from the above, since the air fuel ratio is objectively varied during the on board diagnosis of the $O_2$ sensor with respect to its deterioration and failure, a fluctuation of engine rotating number is induced, such that the present invention is also applied for the period of the on board diagnosis of the $O_2$ sensor with respect to its deterioration and failure, namely the base ignition timing as explained above is corrected in the same way by making use of the same signal value from the $O_2$ sensor diagnosis signal generating means, the value of which has been used for calculating the fuel injection amount, thereby engine torque fluctuation due to air fuel ratio variation is suppressed.

Figure 15:
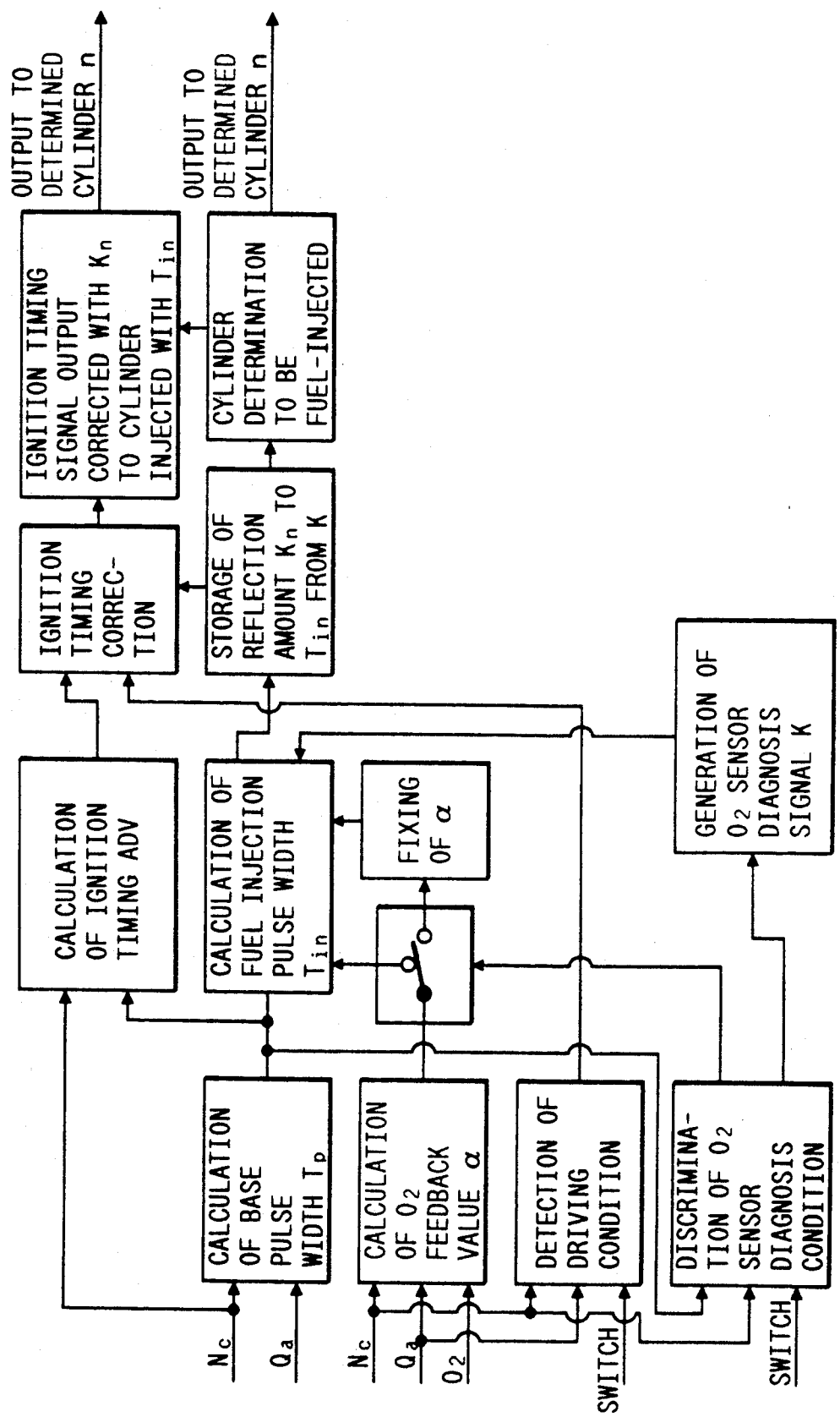
FIG. 15 is a functional block diagram for explaining another embodiment of the present invention which is applied to the internal combustion engine control system having a device for on board diagnosing deterioration or failure of an $O_2$ sensor incorporated therein.

FIG. 15 shows a functional block diagram for explaining steps performed according to another embodiment of the present invention, in that when the present invention is applied to an internal combustion engine electronic control system including an on board diagnosis means of an $O_2$ sensor with respect to its deterioration and failure.

Figure 3:
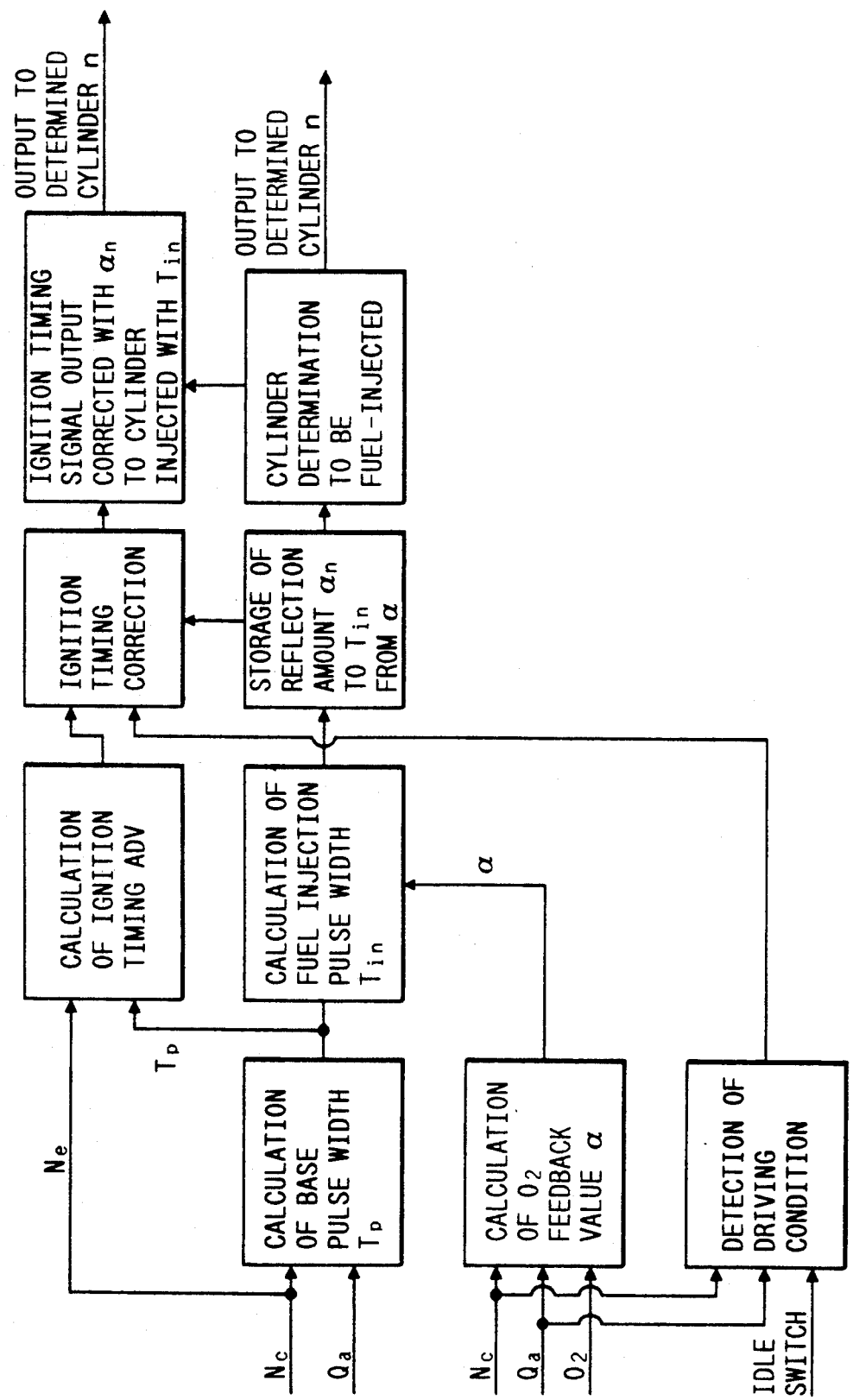
FIG. 3 is a functional block diagram for explaining one embodiment of the method of an electronic engine control for an internal combustion engine having a plurality of cylinders according to the present invention.

In FIG. 15, functions of discriminating $O_2$ sensor diagnosis condition, generating $O_2$ sensor diagnosis signal, fixing the $O_2$ feed back coefficient $\alpha$ and switching $O_2$ feed back coefficient between calculated value and fixed value are added to the functional block diagram shown in FIG. 3.

When the $O_2$ sensor diagnosis condition is fulfilled, the switch function is turned on to the $\alpha$ fixing function and the fix value $\alpha$ is applied to the calculation function of the base fuel injection pulse width $T_P$ as well as K value which varies the air fuel ratio in the pattern as shown in FIG. 13 is applied thereto from the $O_2$ sensor diagnosis signal generating means, and finally the ignition timing for the cylinder to which the fuel corresponding to the calculated $T_{in}$ has been injected is corrected based upon the reflected amount of the K value onto the calculated $T_{in}$.

Accordingly, even if the air fuel ratio varies, the engine torque fluctuation is suppressed and the fluctuation of the engine rotating number is also suppressed.

Figure 16:
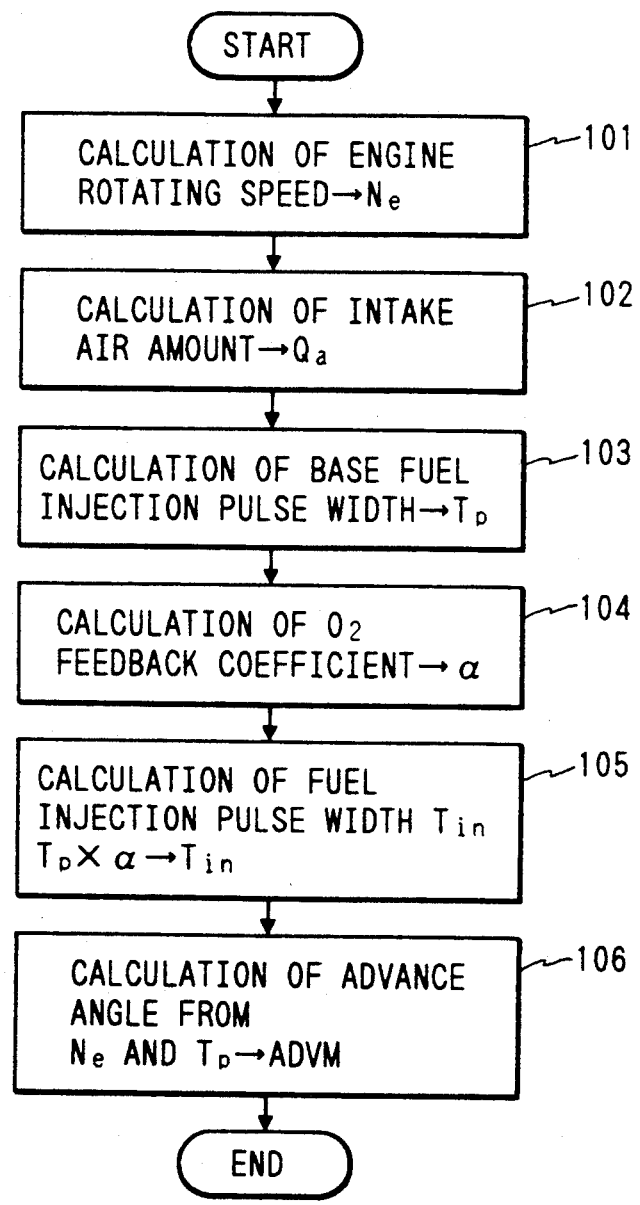
FIGS. 16 and 17 are flow charts for explaining steps according to the present invention.
Figure 17:
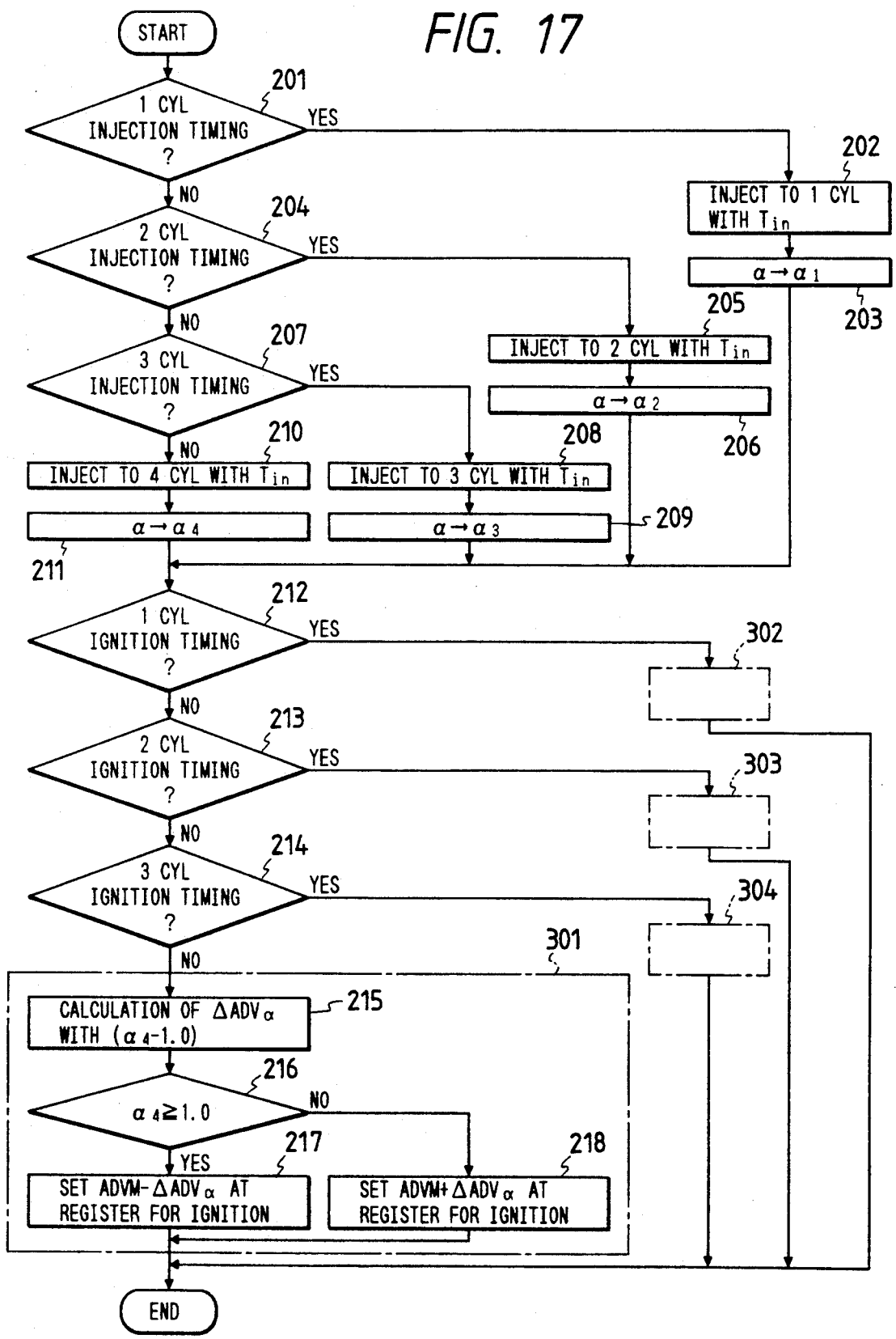

FIG. 16 and FIG. 17 are flow charts for realizing the present invention through a program for a microcomputer. FIG. 16 is a flow chart for the program which is started in every 10 ms, the processing is performed one after another from step 101 to step 103 wherein calculation of engine rotating number $N_e$, intake air flow rate $Q_a$ and base pulse width $T_P$ are executed. Subsequently, in step 104 calculation of air fuel ratio feed back coefficient $\alpha$ is performed based upon the output signal from the $O_2$ sensor. In step 105 calculation of corrected fuel injection pulse width $T_{in}$ is carried out based upon the calculated $O_2$ feed back coefficient $\alpha$. Further in step 106 the base ignition timing ADVM is obtained through the map retrieval by making use of the calculated $N_e$ and $T_{in}$ in the previous steps.

On the other hand, FIG. 17 shows a flow chart for a program processed by an interruption caused at the engine reference position, in that in case of four cylinder type engine, the program is executed every 180° of crank angle. At first in steps 201, 204 and 207 a cylinder into which fuel is injected at the moment is identified, thereafter the process proceeds to the respective corresponding steps 202, 205, 208 and 210. For example assuming that it is the timing when the calculated fuel is to be injected to the No. 1 cylinder the process proceeds to step 202 wherein the fuel injection pulse width $T_{in}$ is set in a register as a value to be injected into the No. 1 cylinder and in step 203 the $O_2$ feed back coefficient $\alpha_1$ at this moment is stored at a storage. In the same manner, the respective fuel injection pulse widths $T_{in}$ for the other cylinders are set in the register and the respective $O_2$ feed back coefficients $\alpha_i(i=2-4)$ are stored at the storage. Subsequently, in steps 212, 213 and 214 which cylinders are in the timing for ignition is judged, for example assuming that the No. 4 cylinder is judged to be in the timing for ignition, the process proceeds to step 205, in which the ignition timing correction component $\Delta ADV\alpha$ is calculated based on the previously set $\alpha_4$. Thereafter, $\alpha_4$ is judged in step 216 whether $\alpha_4$ is larger or smaller than 1.0. When $\alpha_4 \geq 1.0$, the process proceeds to step 217 wherein the ignition timing correction component $\Delta ADV\alpha$ is subtracted from the base ignition timing value ADVM and the result is set into a register used for ignition timing control. On the other hand, when $\alpha_4 < 1.0$, the process proceeds to step 218 wherein the ignition timing correction component Δ ADVα is added to the base ignition timing value and the result is set into the register used for ignition timing control. By these arrangements, the advance and retard control of the ignition time is carried out based upon the same $O_2$ feed back coefficient α. Herein the steps 215-218 for No. 4 cylinder inclusively are identified as step 301 and assuming that step 302 for No. 1 cylinder, step 303 for No. 2 cylinder and step 304 for No. 3 cylinder include the equivalent steps as in the step 301, the steps, 302, 303 and 304 likely perform the corresponding ignition timing setting process as in the step 301 by making use of the respective $O_2$ feed back coefficients $a_i(i=1-3)$.

Figure 18:
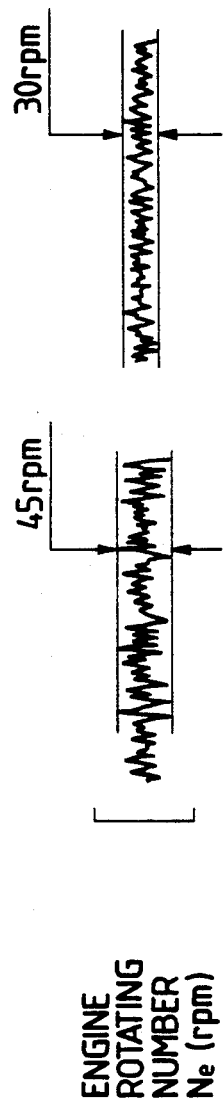
FIGS. 18 and 19 are graphical views showing test results when the present invention was applied to automobiles available in market.
Figure 19:
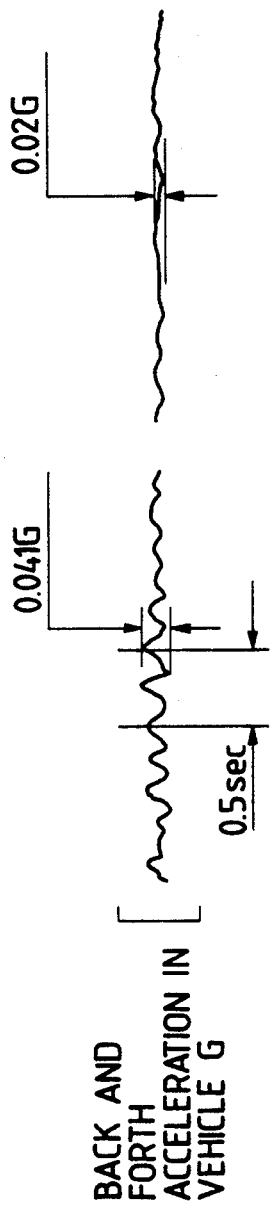

FIG. 18 and FIG. 19 show confirmation test results on effects of the present invention performed on a commercially available automobile.

FIG. 18 shows stability test results during idling which have proved reduction of fluctuation range of engine rotating number from 40 rpm to 30 rpm.

FIG. 19 shows measurement results of back and forth acceleration G of the motor vehicle during a constant speed driving of 1,000 rpm at the second gear position which have proved a large reduction of its fluctuation range from 0.041 G to 0.02 G.

We claim:

1. A method of an electronic engine control for an internal combustion engine having a plurality of cylinders comprising the steps of:
    sequentially taking in engine parameters for the respective cylinders representing the engine operating conditions at corresponding separate timings;
    determining base fuel amounts to be injected to the respective cylinders based upon the corresponding engine parameters taken in for the respective cylinders;
    correcting the determined based fuel amounts for the respective cylinders with respective $O_2$ feed back coefficients obtained at predetermined sequential moments;
    determining base ignition timings for the respective cylinders immediately after the fuel injection of the corrected fuel amounts based upon the same engine parameters as used for determining the corresponding base fuel amounts for the respective cylinders; and
    correcting the determined base ignition timings for the respective cylinders by making use of the same $O_2$ feed back coefficients as used for correcting the corresponding base fuel amounts for the respective cylinders.

2. A method of an electronic engine control for an internal combustion engine having a plurality of cylinders according to claim 1, wherein the correction amount of the ignition timings for the respective cylinders under a partial load condition is determined larger than that under a full load condition.

3. A method of an electronic engine control for an internal combustion engine having a plurality of cylinders according to claim 1, wherein said ignition timing correction step is rendered inoperative when the engine speed has reached about 3,000 rpm.

4. A method of an electronic engine control for an internal combustion engine having a plurality of cylinders according to claim 1, wherein said ignition timing correction step rendered inoperative when the engine speed has reach about 1,000 rpm.

5. A method of an electronic engine control for an internal combustion engine having a plurality of cylinders according to claim 1, wherein the correction of the ignition timings for the respective cylinders are effected so that engine torque fluctuation due to air fuel ratio fluctuation in the respective cylinders is canceled out.

6. A method of an electronic engine control for an internal combustion engine having a plurality of cylinders comprising the steps of:
    sequentially taking in engine parameters for the respective cylinders representing the engine operating conditions at corresponding separate timings;
    determining base fuel amounts to be injected to the respective cylinders based upon the corresponding engine parameters taken in for the respective cylinders;
    generating a signal for deterioration check or failure diagnosis of an $O_2$ sensor when a predetermined diagnosis condition is fulfilled;
    correcting the determined base fuel amounts for the respective cylinders with the signal obtained at predetermined sequential moments;
    determining base ignition timings for the respective cylinders immediately after the fuel injection of the corrected fuel amounts based upon the same engine parameters as used for determining the corresponding base fuel amounts for the respective cylinders; and
    correcting the determined base ignition timings for the respective cylinders by making use of the same signal as used for correcting the corresponding base fuel amounts for the respective cylinders.

* * * * *